(12) United States Patent
Cote et al.

(10) Patent No.: US 7,703,810 B2
(45) Date of Patent: Apr. 27, 2010

(54) SECURITY DEVICE

(75) Inventors: Paul F. Cote, Hollis, NH (US); Timothy T. Crane, Windsor, MA (US); Stephen B. Curdo, Hollis, NH (US); Gerald J. Gartner, Hollis, NH (US); Daniel G. Leeds, Manchester, NH (US)

(73) Assignees: Crane & Co., Inc., Dalton, MA (US); Technical Graphics, Inc., Milford, NH (US)

( * ) Notice: Subject to any disclaimer, the term of this patent is extended or adjusted under 35 U.S.C. 154(b) by 387 days.

(21) Appl. No.: 10/557,739

(22) PCT Filed: Jun. 9, 2004

(86) PCT No.: PCT/US2004/018634

§ 371 (c)(1),
(2), (4) Date: Dec. 12, 2006

(87) PCT Pub. No.: WO2005/001756

PCT Pub. Date: Jan. 6, 2005

(65) Prior Publication Data

US 2007/0095929 A1 May 3, 2007

Related U.S. Application Data

(60) Provisional application No. 60/477,693, filed on Jun. 10, 2003.

(51) Int. Cl.
*G09C 3/00* (2006.01)
*B42D 15/10* (2006.01)
*B42D 15/00* (2006.01)
*G09F 19/00* (2006.01)
*B32B 5/16* (2006.01)
*B32B 7/00* (2006.01)

(52) U.S. Cl. .............................. 283/75; 283/72; 283/74; 283/109; 283/114; 40/615; 428/207; 428/916

(58) Field of Classification Search .................. 40/594, 40/615, 638; 156/108; 235/488; 283/72, 283/107, 108, 109, 110, 111, 112, 114, 904; 428/131, 195.1, 203, 204, 207, 211.1, 457, 428/458, 916; B42D 15/00, 15/10; D21H 21/42; G06K 19/02, 19/06, 19/08
See application file for complete search history.

(56) References Cited

U.S. PATENT DOCUMENTS 4,531,765 A * 7/1985 Shulman ...................... 283/114

(Continued)

FOREIGN PATENT DOCUMENTS

EP 1 310 907 A2 5/2003

(Continued)

*Primary Examiner*—Dana Ross
*Assistant Examiner*—Justin V Lewis
(74) *Attorney, Agent, or Firm*—Holland & Bonzagni, P.C.; Mary R. Bonzagni, Esq.

(57) ABSTRACT

A security device that increases the number of design options available for a machine testable security feature formed in part from a light absorbing (e.g., magnetic) material, while more effectively hiding or concealing this material, is provided. The inventive security device achieves these results by physically separating this security feature from a visually detectable or public security feature. Also provided by way of this invention is a process for preparing the inventive security device as well as a security document that employs one or more such devices.

29 Claims, 3 Drawing Sheets

U.S. PATENT DOCUMENTS

| | | | |
|---|---|---|---|
| 4,773,677 A * | 9/1988 | Plasse | 283/77 |
| 4,980,569 A | 12/1990 | Crane et al. | |
| 5,279,403 A | 1/1994 | Harbaugh et al. | |
| 5,308,992 A | 5/1994 | Crane et al. | |
| 5,354,099 A | 10/1994 | Kaule et al. | |
| 5,394,969 A | 3/1995 | Harbaugh | |
| 5,417,316 A | 5/1995 | Harbaugh | |
| 5,419,424 A | 5/1995 | Harbaugh | |
| 5,486,022 A | 1/1996 | Crane | |
| 5,614,824 A | 3/1997 | Dames et al. | |
| 5,810,146 A | 9/1998 | Harbaugh | |
| 6,255,948 B1 | 7/2001 | Wolpert et al. | |
| 6,457,651 B2 | 10/2002 | Paul et al. | |
| 6,549,131 B1 | 4/2003 | Cote et al. | |
| 2002/0130186 A1 | 9/2002 | Lasch et al. | |
| 2002/0185857 A1 * | 12/2002 | Taylor et al. | 283/72 |

FOREIGN PATENT DOCUMENTS

| | | | |
|---|---|---|---|
| EP | 1310907 A2 * | 5/2003 | |
| GB | 2 250 473 A | 6/1992 | |
| GB | 2250473 A * | 6/1992 | |
| RU | 95106205 A1 | 10/1996 | |

* cited by examiner

SECURITY DEVICE

RELATED APPLICATION

This application claims priority from U.S. Provisional Patent Application Ser. No. 60/477,693, filed Jun. 10, 2003.

TECHNICAL FIELD

The present invention generally relates to a security device that serves to increase the design options available for light absorbing security features while more effectively hiding or concealing these features. The present invention further relates to a process for preparing such a security device and to a security document having one or more such security devices at least partially embedded therein and/or mounted thereon.

BACKGROUND ART

It is known that secure documents or instruments may be rendered less susceptible to forgery or counterfeiting by including security features in various forms within the body of the document. In fact, the security or integrity of a document or instrument will increase with the number of separate and distinct security features that it employs.

Many security papers and other items of value include a security device or element, such as a security thread, disposed on or within the document. The security device typically includes one or more security features, such as metallic, magnetic and/or luminescent security features, that serve to authenticate the security paper and prevent or deter counterfeiting.

A common type of security thread includes metal-formed characters or indicia disposed on a plastic carrier substrate. Such threads, which are coated with a very thin (e.g., 100 to 500 angstrom) layer of metal, such as aluminum, and then demetallized, display either: discrete metal characters as currently used in United States currency; negative or reverse-image characters as currently used in the new Euro currency; or a repeating pattern of isolated metal blocks containing negative or reverse-image characters as described in U.S. Pat. No. 5,486,022 and as used in Indian and Venezuelan currencies. The characters on fully embedded portions of these threads are visually detectable in transmitted light by members of the public. Moreover, these threads may be detected by conventional thread detectors that detect the presence or absence of conductive features on the threads. The repeating patterns of the threads described in U.S. Pat. No. 5,486,022 and employed in Indian and Venezuelan currencies are machine readable as well as machine detectable.

It has long been recognized that while visually detectable or public security features are both necessary and desirable, the use of machine testable security features offer a heightened level of security.

Magnetic materials have been used as machine testable security features in security threads. Unfortunately, these materials have a degree of inherent color, which renders them visually detectable in reflected light through a surface of a security paper. Attempts have therefore been made to hide or conceal these materials.

U.S. Pat. No. 5,354,099 to Kaule et al., in an attempt to produce an improved security thread that matches the appearance of commercially established metallic threads, provides a means for concealing a magnetic ink. In particular, this reference discloses a security thread that serves to combine magnetics with negative metal-formed indicia (i.e., negative writing) on a plastic carrier film. Kaule et al. teach that a metallic coating, due to its reflective properties, constitutes the outermost layer of the negative writing. The process disclosed in Kaule et al. for forming the negative writing involves the formation of multiple layers on the carrier film and the subsequent removal or detachment of these layers to form the "negative writing". The subject process relies in part on "mechanically acting treatment methods" to bring out the "negative writing" more clearly. The ability of the process to produce clear and distinct "negative writing" is enhanced when foaming additives are used where such additives cause the ink to increase in volume thereby creating a bulge on the surface of the thread that provides the "mechanically acting treatment methods" with a good point of attack. See Column 5, lines 2 to 7, of Kaule et al.

Unfortunately, the process identified in Kaule et al. is both time-consuming and arduous. Moreover, combining magnetics with the negative writing limits the design options available for the magnetic security feature.

U.S. Pat. No. 6,549,131 to Cote et al. offers an improved method for concealing magnetic materials. By way of this reference, a laminated security device is provided that includes a carrier substrate, a first metallic layer disposed on the carrier substrate, a magnetic layer disposed on the first metallic layer, and a second metallic layer disposed on the magnetic layer. In one embodiment, these layers collectively form graphic indicia on the carrier substrate, either positively or negatively. A preferred method of making the laminated security device of Cote et al. comprises:

a. providing a carrier substrate;
b. applying a metallic layer to at least a portion of one surface of the carrier substrate;
c. applying a magnetic chemical resist containing a heat and/or pressure activatable adhesive to at least a portion of the metallic layer, where the magnetic chemical resist forms a pattern of graphic indicia on the metallic layer,
d. chemically etching the metallic layer to remove exposed portions of the metallic layer, where chemical etching is resisted by the magnetic chemical resist such that the magnetic chemical resist and a portion of the metallic layer underlying the magnetic chemical resist together form the pattern of graphic indicia on the carrier substrate; and
e. applying a foil film, which is provided on a release coated carrier film, to the pattern of graphic indicia on the carrier substrate under heat and pressure, causing the foil film to bond and cover or conceal the magnetic regions of the graphic indicia pattern.

Although the method of making the laminated security device of Cote et al. offers good process economics, integrating the metal and magnetics into a single graphics design again limits the design options available for the magnetic security feature.

The design of the security thread used in the new Euro currency departs somewhat from the teachings of the prior art references identified above in that instead of using e.g. vacuum deposited metal, these threads employ silver ink to hide the magnetic materials. Unfortunately, the magnetic materials are still visible through an overlying surface of these security papers under reflected light.

A need therefore exists for a security device that overcomes the disadvantages of these prior art security threads.

It is therefore an object of the present invention to provide such a security device.

It is a more particular object to provide a security device that increases the design options for such light absorbing security features.

It is another more particular object to provide a security device that serves to more effectively hide or conceal light absorbing security features, thereby improving the optical quality of security documents that employ this device.

It is yet another more particular object to provide a security device that employs a second carrier substrate, which allows for the use of additional security features or elements such as holographic and/or diffractive security features.

It is a further more particular object to provide a process for preparing such a security device, wherein the process reduces manufacturing demands by eliminating the need to register in one process step and improves process economics by allowing for a reduction in the thicknesses of the layers which make up the device.

It is yet a further more particular object to provide a security document having one or more such security devices at least partially embedded therein and/or mounted thereon, wherein the optical quality of the security document is improved in those areas in which the security device(s) is fully embedded.

SUMMARY OF THE INVENTION

The present invention therefore provides a security device having opposing planar surfaces, which comprises:
- a first carrier substrate having a first optionally repeating pattern of indicia formed thereon, wherein the first carrier substrate is fixably attached to
- A second carrier substrate having a second optionally repeating pattern of indicia formed thereon,
- wherein the first optionally repeating pattern of indicia is formed in part from a machine testable light absorbing material, and
- wherein the first and second patterns of indicia are indistinguishable when the security device is viewed from either opposing planar surface.

The present invention further provides a process for preparing such a security device, which comprises: forming at least one optionally repeating pattern of indicia by printing the pattern of indicia on a metallized carrier substrate using a chemical resist; and chemically etching the printed, metallized carrier substrate to remove metal not protected by the chemical resist.

The present invention also provides a security device, as defined above, wherein the first optionally repeating pattern of indicia comprises a metallic layer and a magnetic layer, and wherein the first optionally repeating pattern of indicia is prepared by a process comprising:
  a. printing a pattern of indicia on a metallized carrier substrate using a magnetic chemical resist; and
  b. chemically etching the printed, metallized carrier substrate to remove metal not protected by the magnetic chemical resist.

The present invention also provides a security document having one or more security devices, as defined above, at least partially embedded therein and/or mounted thereon.

Other features and advantages of the invention will be apparent to one of ordinary skill from the following detailed description and accompanying drawings.

Unless otherwise defined, all technical and scientific terms used herein have the same meaning as commonly understood by one of ordinary skill in the art to which this invention belongs. All publications, patent applications, patents and other references mentioned herein are incorporated by reference in their entirety. In case of conflict, the present specification, including definitions, will control. In addition, the materials, methods, and examples are illustrative only and not intended to be limiting.

BRIEF DESCRIPTION OF THE DRAWINGS

Particular features of the disclosed invention are illustrated by reference to the accompanying drawings, in which.

BEST MODE FOR CARRYING OUT THE INVENTION

Although the security device of the present invention will be described herein mainly as a security strip or thread used in association with banknotes, the invention is not so limited. The security device of the present invention can be utilized in a variety of different forms with any document or means of identification for authentication purposes.

By way of the security device of the present invention, the design options for the first optionally repeating pattern of indicia (i.e., the machine testable security feature), which is formed in part from a machine testable light absorbing material, are increased by physically separating this security feature from the second optionally repeating pattern of indicia (i.e., the visually detectable or public security feature). The inventive security device also overcomes the drawbacks inherent in the security threads used in the new Euro currency by more effectively hiding or concealing light absorbing (e.g., magnetic) security features.

Referring now to the drawings in detail, reference numeral 10 has been used to generally designate a preferred embodiment of the security device of the present invention. Security device 10 basically comprises a first carrier substrate 12 having a first optionally repeating pattern of indicia 14 formed thereon, which is fixably attached to a second carrier substrate 16 having a second optionally repeating pattern of indicia 18 formed thereon. While the first and second optionally repeating patterns of indicia 14, 18, may be in an exactly registered arrangement, such an arrangement is neither necessary nor preferred.

The first and second carrier substrates 12, 16, are light-transmitting carrier substrates that have a thickness ranging from about 4 to about 26 microns (preferably from about 4 to about 12 microns).

In a preferred embodiment, each carrier substrate is formed using one or more essentially colorless polymers selected from the group of polyester, polypropylene, polyethylene, polyethylene terephthalate, and mixtures thereof. In a more preferred embodiment, each carrier substrate is a polyester film.

In another preferred embodiment, the carrier substrates 12, 16, are colored and/or luminescent and, in yet another preferred embodiment, at least one carrier substrate contains optical marks such as diffractive gratings and/or hologram structures.

Further to the above, at least one carrier substrate preferably provides adhesive properties to bond the security device 10 into or onto a security document such as paper.

The first optionally repeating pattern of indicia 14 is a machine testable security feature that embodies machine-detectable and optionally machine-readable information. The first pattern of indicia 14 comprises:

a. at least one layer of a machine testable light absorbing material 20 that would be discernible through an overlying or underlying surface of a security paper in reflected light; and b. at least one layer of a camouflage or masking material 22, which is positioned between the first carrier substrate 12 and the light absorbing material layer(s) 20.

The term "light absorbing", as used herein, is intended to mean any inherently colored material that would be visually detectable in reflected light through an overlying layer of a security paper. Such materials typically absorb greater than about 95% of incident light.

Examples of machine testable, inherently colored materials include, but are not limited to, magnetic materials and electronically resonating materials.

Magnetic materials include both "hard" and "soft" magnetic materials, which have varying degrees of inherent color ranging from light silver-gray to dark or black.

Hard magnetic materials, such as iron oxides, which have relatively high coercivities (i.e., >10 kiloamperes/meter), are detected by their remanent magnetization after exposure to a magnetic field. The magnetic field is applied either at manufacture, or just before detection.

Soft magnetic materials, such as nickel cobalt, which has a relatively low coercivity, can be detected using the permeability, coercivity, B—H (magnetization/demagnetization) loop, non-linearity and/or magnetization characteristics of these materials.

Soft-magnetic materials, such as pure iron, can be produced as a light silver-gray pigment These pigments have a high permeability and, due to their high iron content (typically 99.5%), they have very high saturation magnetization.

The term "camouflage or masking material", as used herein, is intended to mean any material that renders the light absorbing material virtually undetectable to the unaided eye in reflected light through a surface of a security document, thereby improving the optical quality of security documents that employ this device. Such materials typically reflect greater than about 95% of incident light.

Suitable camouflage or masking materials include, but are not limited to, metal or metallic materials.

Examples of metal or metallic materials, which are suitable for use in the present invention, include, but are not limited to, aluminum (Al), chromium (Cr), cobalt (Co), copper (Cu), gold (Au), iron (Fe), nickel (Ni), silver (Ag), or alloys of two or more of the aforementioned materials. In a more preferred embodiment, the metal or metallic material is aluminum.

The first optionally repeating pattern of indicia 14 or machine testable security feature may adopt any form or presentation including any type and combination of symbol, design, shape or other graphic indicia, provided the security feature is substantially covered or concealed by the second optionally repeating pattern of indicia 18.

The thickness of the first optionally repeating pattern of indicia 14 ranges from about 1.0 to about 20.0 microns, and preferably ranges from about 3.0 to about 12.0 microns.

The first optionally repeating pattern of indicia 14 may be prepared using conventional techniques, such as those described in U.S. Pat. No. 6,255,948, which is incorporated herein by reference.

In a preferred embodiment, the optionally repeating pattern of indicia 14 is formed by printing (via conventional printing techniques, such as gravure or screen printing methods) directly on a metallized plastic web or sheet using a formulation that contains the machine testable light absorbing material and a chemical resist for rendering the formulation resistant to a metal reactive solvent. The printed, metallized plastic web is then exposed to a metal reactive solvent to chemically etch or dissolve the non-printed metal areas on the plastic web.

Examples of chemical resists include, but are not limited to, solvent based, water based or solid based, ultraviolet (UV) or electron beam (EB) polymerized resin systems (e.g., polyester resin systems), and other conventional chemical resist resins.

Chemical etching is carried out using appropriate etchants such as sodium hydroxide, ferric chloride or a hydrofluoric acid/nitric acid mix and techniques that serve to etch to the full depth of the deposited metal layer(s) in those areas not protected by the chemical resist resin.

In a more preferred embodiment, the machine testable light absorbing material is magnetic particles and the printing formulation comprises from about 50 to about 95% by weight of the magnetic particles, and from about 50 to about 5% by weight of an etchant resistant resin.

The second optionally repeating pattern of indicia 18 or public security feature takes the form of information (e.g., letters, numbers, symbols) that is visually perceivable when viewed in transmitted light and, optionally, machine-detectable and optionally machine-readable information, and comprises at least one layer of a metal or metallic material 24.

The second optionally repeating pattern of indicia 18 may also be prepared using conventional techniques.

Figure 2A:
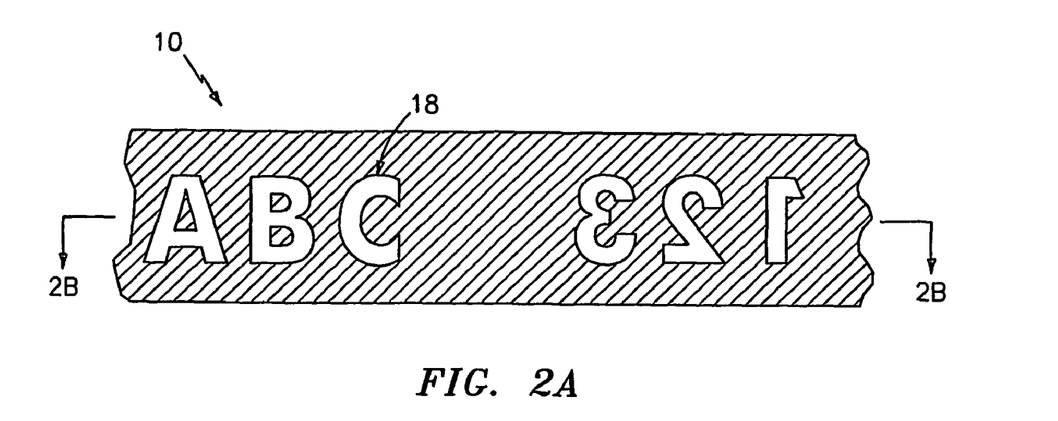
FIG. 2A is a top planar view of another preferred embodiment of the inventive security device, where the second pattern of indicia is formed from two layers of different materials.
Figure 2B:
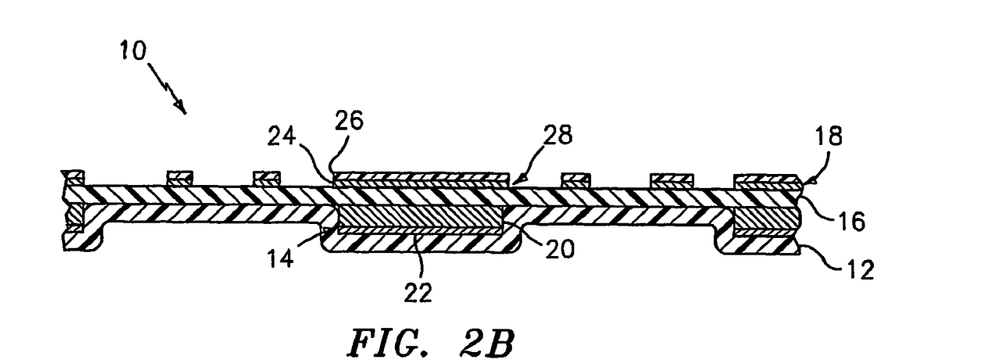
FIG. 2B is a cross-sectional view of the security device shown in FIG. 2A, taken along line 2B.
Figure 2C:
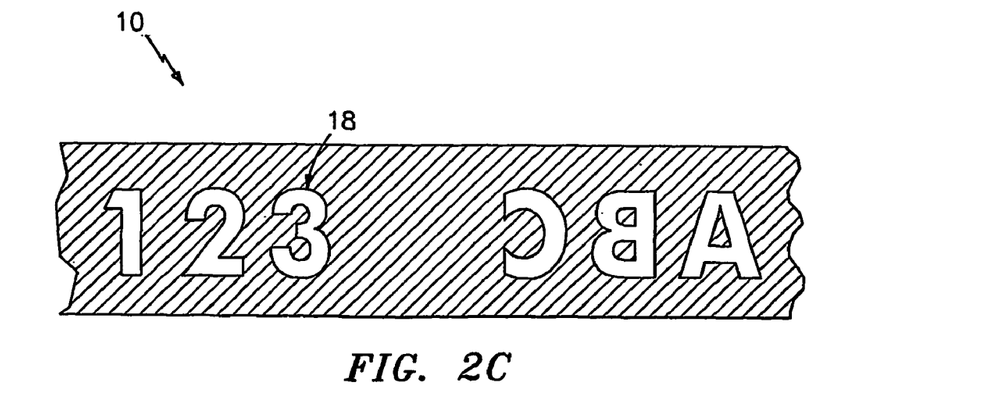
FIG. 2C is a bottom planar view of the security device shown in FIG. 2A.

In a preferred embodiment, the second optionally repeating pattern of indicia 18 is formed directly on a metallized plastic web or sheet by printing using a clear chemical resist which is resistant to a metal reactive solvent. The printed, metallized plastic web is then exposed to a metal reactive solvent to dissolve the non-printed metal areas on the plastic web. As best shown in FIG. 2B, the formed pattern of indicia 18 is made up of a first metal layer 24 and a second clear chemical resist layer 26.

Suitable clear chemical resists include, but are not limited to, solvent based, water based or solid based, ultraviolet (UV) or electron beam (EB) polymerized resin systems (e.g., polyester resin systems).

The first carrier substrate 12 may be fixably adhered or laminated to the second carrier substrate 16 by using a light-transmitting adhesive.

Light-transmitting laminating adhesives, suitable for use in the practice of the present invention, guarantee good bond strength between the carrier substrates and should be light stable, resistant to ageing, free from fine coagulum and exhibit little foaming. Examples of such light-transmitting laminating adhesives include, but are not limited to, acrylic polymers and copolymers, modified acrylic polymers and copolymers and polyesters. In a preferred embodiment, the light-transmitting laminating adhesive is a solvent based resin solution.

When embedded in e.g. a banknote, the first and second patterns of indicia 14, 18, while physically separated by the second carrier substrate 16, have the appearance of a single graphics design under transmitted illumination, making it difficult for a counterfeiter to ascertain how many security features are in fact present. A heightened level of security is therefore obtained for documents employing the security device 10 of the present invention. As evident from viewing FIGS. 1A and 1C and FIGS. 2A and 2C, security device 10 has the additional advantage of looking substantially similar on the front and back and therefore does not have to be incorporated into e.g. a security paper or banknote, true to side.

Figure 1A:
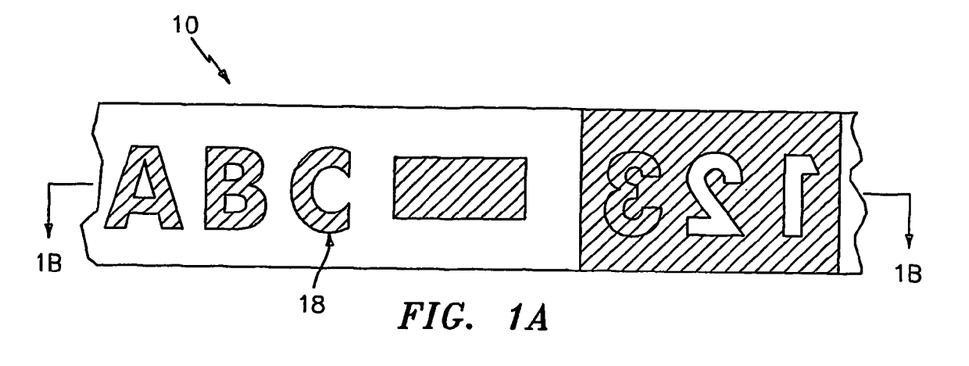
FIG. 1A is a top planar view of a preferred embodiment of the security device of the present invention, where the second pattern of indicia is formed from a single layer of material.
Figure 1B:
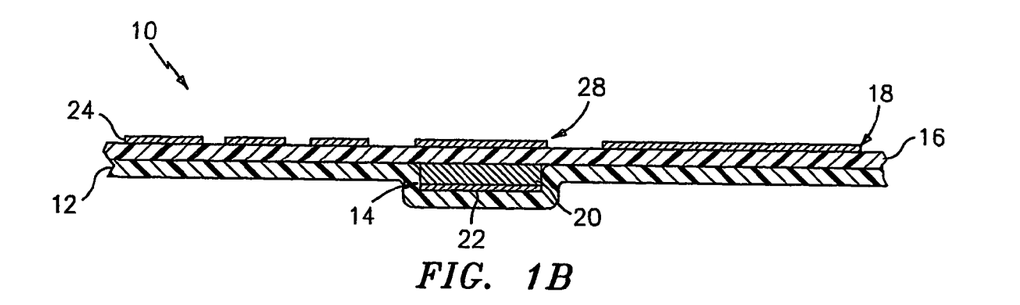
FIG. 1B is a cross-sectional view of the security device shown in FIG. 1A, taken along line 1B.
Figure 1C:
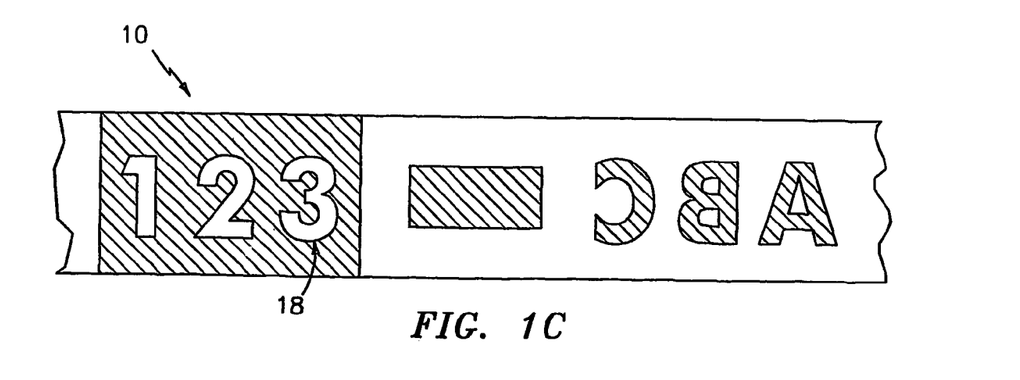
FIG. 1C is a bottom planar view of the security device shown in FIG. 1A.

In order to insure the appearance of a single graphics design under transmitted illumination, the upper exposed surface of the light absorbing material of the first optionally repeating pattern of indicia 14 must be substantially hidden or concealed by the second optionally repeating pattern of indicia 18. For example, and as best shown in FIGS. 1B, 2B and 3, when the first pattern of indicia 14 is a repeating pattern of geometric shapes, each geometric shape must be positioned below a solid metal or metallic portion 28 of the second optionally repeating pattern of indicia 18 and must be of a size smaller than (or in register with) portion 28.

As will be readily appreciated by those skilled in the art, the fact that the first optionally repeating pattern of indicia 14 does not need to be co-extensive with the second optionally repeating pattern of indicia 18, allows for a limitless number of design options for this machine testable security feature.

The security device 10 of the present invention may include additional layers or coatings, provided however that any such additional layer or coating does not interfere with the visual perception of the information conveyed by way of the first and second patterns of indicia 14, 18, and/or the signals seen by authenticity testing devices. Contemplated additional layers or coatings include outer protective layers, light-transmitting adhesive layers on either or both sides of device 10 that facilitate the incorporation of the device into or onto security documents and fluorescent coatings made up of eosin, fluorescein, fluorspar, fuchsin, sulphate of quinine, calcium sulphide, Neodyrnium salicylate, Samarium gluconate, Yttrium salicylate and the like.

Figure 3:
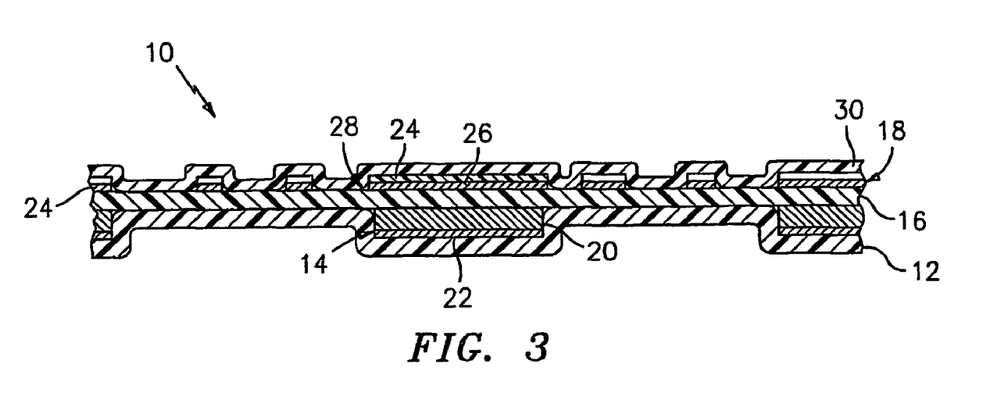
FIG. 3 is a cross-sectional view of a further preferred embodiment of the security device of the present invention, which employs a protective outer layer.

In a preferred embodiment, and as best shown in FIG. 3, security device 10 employs an outer protective layer 30. The outer protective layer 30 is a light-transmitting protective layer that may take the form of a protective film having a thickness ranging from about 3.0 to about 12.0 microns (preferably from about 3.0 to about 6.0 microns) or a printed coating having a thickness ranging from about 1.0 to about 6.0 microns.

In a more preferred embodiment, the protective layer 30 is formed using one or more essentially colorless polymers selected from the group of polyester, polypropylene, polyethylene, polyethylene terephthalate, and mixtures thereof. In a most preferred embodiment, the protective layer is a laminated polyester film.

In another more preferred embodiment, the protective layer 30 is colored and/or luminescent and, in yet another more preferred embodiment, the protective layer provides adhesive properties to bond the security device 10 into or onto paper.

The outer protective layer 30 may be laminated to the second pattern of indicia 18 and to second carrier substrate 16 by using the light-transmitting adhesives described above.

In a most preferred embodiment of the present invention, the first optionally repeating pattern of indicia 14 comprises a layer of aluminum metal and a layer of a machine testable ferromagnetic material, the second optionally repeating pattern of indicia 18 comprises a layer of aluminum metal and a layer of clear chemical resist, and the security device 10 is prepared by a process comprising:

a. preparing the first optionally repeating pattern of indicia 14 by a process comprising: printing an optionally repeating pattern of indicia on a first metallized carrier substrate using a ferro-magnetic chemical resist; and chemically etching the printed, metallized carrier substrate to remove metal not protected by the ferro-magnetic chemical resist;

b. laminating a second metallized carrier substrate to the first carrier substrate 12 using a solvent based adhesive; and c. preparing the second optionally repeating pattern of indicia 18 by a process comprising: printing a pattern of indicia on the second metallized carrier substrate using a clear chemical resist; and etching the printed, metallized carrier substrate to remove metal not protected by the clear chemical resist.

The inventive process eliminates the need to register the patterns of magnetic and metallic indicia on the first carrier substrate thereby reducing manufacturing demands and improving process economics. The inventive process also allows for the use of thinner layers where the layers do not need to be transferred from an existing structure, as in U.S. Pat. No. 6,549,131 to Cote et al. Other attractive features inherent in the inventive process include the fact that the process is amenable to high speed printing and etching methodologies and the combination of the first and second carrier substrates are equally amenable to high speed lamination.

The security document of the present invention is preferably a security paper and the security device 10, which is preferably in the form of a security thread, is wholly or partially embedded within the paper and/or mounted thereon.

For partially embedded security devices 10, portions thereof are exposed on one or opposing surfaces of the security document. In one such embodiment, portions of the security device 10, which is in the form of a security thread, are exposed on one surface of the document at spaced intervals along the length of the thread at windows or apertures in the document.

In another such embodiment, the security document is provided with one or more window-like through openings, with device 10 being exposed at the same location on both sides of the security document at these openings. The security document may also be provided with one or more window-like non-through openings which serve to expose device 10 on only one surface or side of the document. While preferably in the form of a security thread, it is noted that the size and shape of the device 10 is limited only to the extent that it extend beyond the through and non-through openings on all sides.

In a preferred embodiment, the partially embedded security device 10 is transparent in the region of the window-like through opening(s). In a more preferred embodiment, the security device 10 is provided with additional security features such as diffraction structures (e.g., structures having optical-diffraction or optical-refraction effect) and polarizing filters. For example, the security device 10 may be provided with a polarizing filter in the region of the window-like through opening and the security document may be provided with a modified optical image on a surface thereof. The modified optical image would reveal a hidden message when the document is folded upon itself and the image viewed through the polarizing filter.

The number, size, shape and position of the window-like through and non-through openings are not limited. In fact, variations in security documents can be made possible by varying one or more of these features.

The security device 10 may be at least partially incorporated in security papers during manufacture by techniques commonly employed in the papermaking industry. For example, the inventive device 10 in the form of a security thread may be fed into a cylinder mold papermaking machine, cylinder vat machine, or similar machine of known type, resulting in total or partial embedment of the thread within the body of the finished paper. In one such manufacturing technique, two layers of paper having one or more window-like through openings are brought together. During the operation of bringing them together, a security thread is introduced such that at least one window in each layer coincide in aligned relationship with each other and with the thread so that the security thread is exposed at the same location on the resulting paper web on both sides thereof.

In addition to the above, the security device 10 of the present invention may be mounted on the surface of security documents (e.g., security papers). In one such embodiment, the security document is provided with one or more window-like through openings, at least one of which is covered by the security device 10. The security device 10 projects beyond the opening on all sides and is fixed (over its entire surface area) to the surface of the security document. As noted above, the size and shape of the device 10 is limited only to the extent that it extend beyond the through opening on all sides.

In the region of the opening the security device 10 is transparent and may be provided with additional security features such as diffraction structures and polarizing filters.

In one contemplated embodiment, the security device 10 is provided with a polarizing filter in the region overlying the window-like through opening and the security document is provided with a modified optical image on a surface thereof. The modified optical image reveals a hidden message when the document is folded upon itself and the image viewed through the polarizing filter.

The window-like through openings may be produced either during manufacture or during a subsequent converting process by means of, for example, a punching or cutting (e.g., laser cutting) operation.

Mounting of the device 10 to the surface of a security document, or to a depression formed in the document surface, may be achieved by any number of known techniques including: applying a pressure-sensitive adhesive to a surface of the device 10 and pressing the device 10 to the optionally depressed surface of the document; and applying a heat activated adhesive to a surface of the device 10 and applying the device 10, using thermal transfer techniques, to the optionally depressed surface of the document.

Detection schemes contemplated for use with the first optionally repeating pattern of indicia 14, and possibly also with the second optionally repeating pattern of indicia 18, include simple recognition/authentication schemes and data/identification/denomination detection schemes.

Simple recognition/authentication can be achieved using various properties of the materials that form indicia patterns 14, 18. In particular, indicia pattern 14 employing metallic and magnetic materials may be authenticated by, for example, detecting whether or not one or more metallic and/or magnetic properties are present on security device 10.

Detection of metal or metallic security features may be carried out by detectors that depend upon intrinsic metal properties such as capacitance and microwave resonance. Such detectors and the detection means or mechanisms upon which they rely are shown and described in U.S. Pat. Nos. 4,980,569, 5,279,403, 5,308,992, 5,394,969, 5,417,316, 5,419,424 and 5,810,146, which are incorporated herein by reference.

Detection of "hard" magnetic materials having high coercivities of greater than 10 kiloamperes/meter can be detected by their remanent magnetization after exposure to a magnetic field. The magnetic field can be applied either at manufacture or just before detection.

Detectable magnetic characteristics of "soft" magnetic materials include permeability, coercivity, B—H (magnetization/demagnetization) loop, non-linearity and magnetization characteristics. Detection can be accomplished by mid-range (i.e., 1 to 2 mm between the detector head and the magnetic feature) examination of magnetic properties with an imposed magnetic field. Such detection schemes are described in U.S. Pat. No. 5,614,824, which is also incorporated herein by reference.

Data/identification/denomination detection schemes basically involve the use of one or more material properties (e.g., one or more metallic and/or magnetic properties) for the purpose of encoding data (i.e., analog or digital) onto a carrier substrate. Once the security device is employed on or within a security document, the data can be detected, read, and decoded and the security documents authenticated and identified.

Metallic materials and/or magnetic materials (in the form of one or more "hard" magnetic materials and/or one or more "soft" magnetic materials) may be patterned or used to encode data onto a carrier substrate in a multitude of ways.

Patterning or encoding schemes involving magnetic materials and/or metal or metallic materials are described in U.S. Pat. No. 6,549,131, which is incorporated herein by reference.

While various embodiments of the present invention have been described above, it should be understood that they have been presented by way of example only, and not limitation. Thus, the breadth and scope of the present invention should not be limited by any of the exemplary embodiments.

Having thus described the invention, what is claimed is:

1. A security device having opposing planar surfaces, which is suitable for use with any document or means of identification for authentication purposes, and which comprises:

a first light-transmitting carrier substrate having a first optionally repeating pattern of indicia formed thereon, wherein the first carrier substrate is fixably attached to a second light-transmitting carrier substrate having a second optionally repeating pattern of indicia formed thereon, wherein the second optionally repeating pattern of indicia comprises at least one layer of a metal or metallic material, said pattern of indicia including areas free from metal or metallic material, wherein the first optionally repeating pattern of indicia is formed in part from a machine testable light absorbing material, and wherein the first and second patterns of indicia are used to authenticate a document or means of identification when the security device is used therein, wherein the patterns are different in form and color yet indistinguishable when the security device is viewed from either opposing planar surface.

2. The security device of claim 1, wherein the first optionally repeating pattern of indicia comprises:
   a. at least one layer of a machine testable light absorbing material; and
   b. at least one layer of a camouflage or masking material, which is positioned between the first carrier substrate and the light absorbing material layer(s).

3. The security device of claim 2, wherein the machine testable light absorbing material is selected from the group including magnetic materials and electronically resonating materials.

4. The security device of claim 2, wherein the camouflage or masking material is a metal or metallic material.

5. The security device of claim 4, wherein the metal or metallic material is selected from the group including aluminum, chromium, cobalt, copper, gold, iron, nickel, silver, alloys of two or more metal or metallic materials, and combinations thereof.

6. The security device of claim 2, wherein the first optionally repeating pattern of indicia comprises a magnetic chemical resist layer and a metallic layer.

7. The security device of claim 1, wherein the second optionally repeating pattern of indicia comprises a metal or metallic layer and a clear chemical resist layer.

8. The security device of claim 1, wherein the first carrier substrate is fixably attached to the second carrier substrate using a light-transmitting adhesive.

9. The security device of claim 8, wherein the light-transmitting adhesive is selected from the group including acrylic polymers and copolymers, modified acrylic polymers and copolymers and polyesters.

10. The security device of claim 1, which further comprises an outer light-transmitting protective layer.

11. The security device of claim 10, where the outer protective layer is formed using one or more essentially colorless polymers selected from the group including polyester, polypropylene, polyethylene, polyethylene terephthalate, and mixtures thereof.

12. The security device of claim 1, which is prepared by a process which comprises: forming at least one optionally repeating pattern of indicia by printing the pattern of indicia on a metallized carrier substrate using a chemical resist; and chemically etching the printed, metallized carrier substrate to remove metal not protected by the chemical resist.

13. The security device of claim 12, wherein the first optionally repeating pattern of indicia comprises a metallic layer and a magnetic chemical resist layer, and wherein the first optionally repeating pattern of indicia is prepared by a process comprising:
   a. printing a pattern of indicia on a metallized carrier substrate using a magnetic chemical resist; and
   b. chemically etching the printed, metallized carrier substrate to remove metal not protected by the magnetic chemical resist.

14. The security device of claim 12, wherein the second optionally repeating pattern of indicia comprises a metallic layer and a clear chemical resist layer, and wherein the second optionally repeating pattern of indicia is prepared by a process comprising:
   a. printing a pattern of indicia on a metallized carrier substrate using a clear chemicial resist; and
   b. chemically etching the printed, metallized carrier substrate to remove metal not protected by the clear chemical resist.

15. The security device of claim 1, wherein the first optionally repeating pattern of indicia comprises a layer of aluminum metal and a layer of a machine testable ferro-magnetic chemical resist, the second optionally repeating pattern of indicia comprises a layer of aluminum metal and a layer of clear chemical resist, and the security device is prepared by a process comprising:
   a. preparing the first optionally repeating pattern of indicia by a process comprising: printing an optionally repeating pattern of indicia on a first aluminum coated carrier substrate using a ferro-magnetic chemical resist; and chemically etching the printed, aluminum coated carrier substrate to remove metal not protected by the ferro-magnetic chemical resist;
   b. laminating a second aluminum coated carrier substrate to the first carrier substrate; and
   c. preparing the second optionally repeating pattern of indicia by a process comprising: printing a pattern of indicia on the second aluminum coated carrier substrate using a clear chemical resist; and etching the printed, aluminum coated carrier substrate to remove metal not protected by the clear chemical resist.

16. A process for preparing a security device, wherein the security device has opposing planar surfaces, is suitable for use with any document or means of identification for authentication purposes, and comprises: a first carrier substrate having a first optionally repeating pattern of indicia formed thereon, wherein the first carrier substrate is fixably attached to a second carrier substrate having a second optionally repeating pattern of indicia formed thereon,
   wherein the first optionally repeating pattern of indicia comprises:
   a. at least one layer of a machine testable light absorbing material; and
   b. at least one layer of a camouflage or masking material, which is positioned between the first carrier substrate and the light absorbing material layer(s);
   wherein the second optionally repeating pattern of indicia comprises at least one layer of a metal or metallic material, said pattern of indicia including areas free from metal or metallic material,
   wherein the first and second patterns of indicia are used to authenticate a document or means of identification when the security device is used therein, wherein the 0attems are different in form and color yet these patterns are indistinguishable when the security device is viewed from either opposing planar surface, and
   wherein the process comprises:
   i. preparing the first optionally repeating pattern of indicia by a process comprising: printing an optionally repeating pattern of indicia on a first metallized carrier substrate using a chemical resist that contains the machine testable light absorbing material; and chemically etching the printed, metallized carrier substrate to remove metal not protected by the chemical resist;
   ii. laminating a second metallized carrier substrate to the first carrier substrate and
   iii. preparing the second optionally repeating pattern of indicia by a process comprising: printing a pattern of indicia on the second metallized carrier substrate using a clear chemical resist; and etching the printed, metallized carrier substrate to remove metal not protected by the clear chemical resist.

17. The process for preparing a security device of claim 16, wherein the machine testable light absorbing material is a magnetic material.

18. A security document having one or more security devices at least partially embedded therein and/or mounted thereon, wherein at least one security device has opposing planar surfaces and comprises:

a first carrier substrate having a first optionally repeating pattern of indicia formed thereon, wherein the first carrier substrate is fixably attached to a second carrier substrate having a second optionally repeating pattern of indicia formed thereon wherein the second optionally repeating pattern of indicia comprises at least one layer of a metal or metallic material, said pattern of indicia including areas free from metal or metallic material, wherein the first optionally repeating pattern of indicia is formed in part from a machine testable light absorbing material, and wherein the first and second patterns of indicia of the security device are used to authenticate the security document and are different in form and color yet indistinguishable when the security device is viewed from either opposing planar surface.

19. The security document of claim 18, wherein the first optionally repeating pattern of indicia of the security device comprises:
   a. at least one layer of a machine testable light absorbing material; and
   b. at least one layer of a camouflage or masking material, which is positioned between the first carrier substrate and the light absorbing material layer(s).

20. The security document of claim 18, which is provided with one or more window-like through openings, wherein the security device is mounted on a surface of the security document covering at least one such through opening, and wherein the security device is transparent in an area overlying the through opening(s).

21. The security document of claim 20, wherein the security device further comprises at least one additional security feature in the area overlying the through opening(s).

22. The security document of claim 21, wherein the at least one additional security feature is a polarizing filter, wherein the security document is provided with a modified optical image on a surface thereof, and wherein the modified optical image reveals a hidden message when the document is folded upon itself and the image viewed through the polarizing filter.

23. The security document of claim 18, which is provided with one or more window-like through openings, wherein the security device is partially embedded within the document, and wherein the security device is exposed at the same location on both sides of the document at the through opening(s).

24. The security document of claim 23, which is further provided with one or more window-like non-through openings, wherein the security device is also exposed at the non-through opening(s).

25. The security document of claim 23, wherein the security device is transparent in the area of the through opening(s).

26. The security document of claim 25, wherein the security device further comprises at least one additional security feature in the area of the through opening(s).

27. The security document of claim 26, wherein the at least one additional security feature is a polarizing filter, wherein the security document is provided with a modified optical image on a surface thereof, and wherein the modified optical image reveals a hidden message when the document is folded upon itself and the image viewed through the polarizing filter.

28. A security device having opposing planar surfaces which is suitable for use with any document or means of identification for authentication purposes, and which comprises:
   a first light-transmitting carrier substrate having a first optionally repeating pattern of indicia formed thereon, the first pattern of indicia comprising: at least one layer of a light absorbing material; and at least one layer of a camouflage or masking material positioned between the first carrier substrate and the light absorbing material layer(s), wherein the first carrier substrate is fixably attached to
   a second light-transmitting carrier substrate having a second optionally repeating pattern of indicia formed thereon, wherein the second optionally repeating pattern of indicia comprises at least one layer of a metal or metallic material, said pattern of indicia including areas free from metal or metallic material,
   wherein the first and second patterns of indicia are different in form and color and are used to authenticate a document or means of identification when the security device is used therein, and
   wherein the light absorbing material layer(s) of the first pattern of indicia is located between and substantially hidden or concealed by the camouflage or masking material layer(s) and the second pattern of indicia.

29. A security device having opposing planar surfaces, which is suitable for use with any document or means of identification for authentication purposes, and which comprises:
   a first light-transmitting carrier substrate having a first optionally repeating pattern of indicia formed thereon, the first pattern of indicia comprising: at least one layer of a magnetic material; and at least one layer of a metal or metallic material positioned between the first carrier substrate and the magnetic material layer(s), wherein the first carrier substrate is fixably attached to
   a second light-transmitting carrier substrate having a second optionally repeating pattern of indicia formed thereon, the second pattern of indicia comprising at least one layer of a metal or metallic material, said pattern of indicia including areas free from metal or metallic material,
   wherein the first and second patterns of indicia are different in form and color and are used to authenticate a document or means of identification when the security device is used therein, and
   wherein the magnetic material layer(s) of the first pattern of indicia is located between and substantially hidden or concealed by the metal or metallic material layers of the first and second patterns of indicia.

* * * * *